*United States Patent* [19]

Chapman et al.

[11] Patent Number: 5,186,388
[45] Date of Patent: Feb. 16, 1993

[54] PRODUCTION OF COMPOSITE STRUCTURES USING LIGHTWEIGHT LOW COST MATRIX EXTENDER MATERIALS

[75] Inventors: Michael Chapman, Portsmouth, R.I.; Michael Sumple, Danbury, Conn.

[73] Assignee: Electrostatic Components, Inc., Bridgeport, Conn.

[21] Appl. No.: 745,930

[22] Filed: Aug. 16, 1991

[51] Int. Cl.$^5$ .................. B05B 7/08; B05B 7/14; B05B 7/30
[52] U.S. Cl. .......................... 239/8; 239/74; 239/143; 239/306; 239/325; 239/336; 239/420; 239/422; 239/DIG. 8
[58] Field of Search ............ 239/71, 74, 143, 304, 239/306, 325, 335, 336, 418–419.3, 420, 422, DIG. 8, 8

[56] References Cited

U.S. PATENT DOCUMENTS

| | | | |
|---|---|---|---|
| 3,676,197 | 7/1972 | Harrison et al. | 239/DIG. 8 |
| 3,927,833 | 12/1975 | Harrison et al. | 239/DIG. 8 |
| 4,474,327 | 10/1984 | Mattson et al. | 239/143 |
| 4,770,117 | 9/1988 | Hetherington et al. | 239/DIG. 8 |
| 4,809,909 | 3/1989 | Kukesh | 239/DIG. 8 |
| 4,967,956 | 11/1990 | Mansfield | 239/DIG. 8 |
| 5,064,120 | 11/1991 | Luttrell, Jr. | 239/DIG. 8 |

FOREIGN PATENT DOCUMENTS

2581324 11/1986 France ................ 239/325

*Primary Examiner*—Andres Kashnikow
*Assistant Examiner*—Karen B. Merritt
*Attorney, Agent, or Firm*—John R. Doherty

[57] ABSTRACT

A process and apparatus are provided for injecting dry lightweight particulate material into a stream of catalyzed resin. The dry lightweight particulate material is stored in a fluidizing tank. The fluidized dry particles are conveyed from the tank under a controlled vacuum created by a low pressure venturi pump. An anti-static conveying tube delivers the dry lightweight particulate material to an adjustable delivery tube which terminates with a nozzle. The nozzle delivers a low velocity controlled spray pattern which coincides with the stream of pressurized resin. The nozzle is positioned at an acute angle relative to the longitudinal axis of the resin stream and injects the dry lightweight particulate material into the stream. Within the venturi pump and opposite to the main low pressure, low volume inlet, is a second pressurized inlet. This inlet directly controls the degree of vacuum, thereby precisely determining the amount of dry lightweight particles delivered to the resin stream. The degree of vacuum can be sensed by a tube connected to the venturi pump, and through electronic circuitry is converted to a visual display.

28 Claims, 7 Drawing Sheets

PRODUCTION OF COMPOSITE STRUCTURES USING LIGHTWEIGHT LOW COST MATRIX EXTENDER MATERIALS

BACKGROUND OF THE INVENTION

This invention relates to the production of multiple component composite structures by spray depositing mixtures of a resin and catalyst along with a lightweight, low cost, dry particulate filler material such as hollow glass microspheres and other hollow bodies having a specific gravity of less than about 1.00, and optionally a fibrous reinforcing material such as glass fibers or carbon fibers, for example.

It is known in the prior art that composite structures made by spray depositing mixtures of a resin and catalyst along with a reinforcing material such as fiberglass are strong but not necessarily very rigid. Stiffness is a function of thickness and in order to attain a required degree of rigidity, it has become the practice to make the composites thicker by adding extra resin and reinforcing material. Unfortunately, this greatly increases the cost and weight of the composite. Since rigidity or stiffness is related to the composite thickness, what is clearly needed is a matrix extender system which will increase the composite thickness but which at the same time is lightweight and inexpensive.

Microspheres, in the form of lightweight hollow glass or silicate spheres, are ideal materials to achieve extension in many reinforced composite structures. Microspheres are very lightweight generally having a specific gravity of less than about 1.00, they are inexpensive and significantly reduce exotherm shrinkage and cracking when used as a filler or extender in a composite structure.

Heretofore, attempts to employ hollow microspheres in the production of reinforced composite structures have not proven to be successful. Until now, the only way of placing the hollow spheres into the composites has been by premixing the spheres into the resin. This has essentially two processing problems, first, since the spheres are considerably lighter than the resin, they tend to rise to the surface of the resin and will not remain in suspension. Hence, it is very difficult to maintain an even distribution of the spheres within the resin. The second problem is that when the hollow spheres are finally passed through the resin pump, high pressures are attained which tend to collapse the spheres and render them ineffective. This collapsing of the spheres can be somewhat eliminated by increasing the wall thickness of the spheres but this unfortunately diminishes the cost effectiveness of the spheres to the point where it is more practical to employ the heavier solid fillers, such as calcium carbonate, for example.

It has also been proposed in the prior art to inject a dry particulate filler material into a resin- and catalyst-containing stream such as that produced by a conventional spray gun and then depositing the resulting mixture onto a mold or substrate for forming the composite structure. Such a system is disclosed, for example, in U.S. Pat. No. 3,927,833 issued to Harrison, et al on Dec. 23, 1975. This device employs a spray gun and a pair of delivery tubes disposed adjacent to the spray nozzle for injecting the dry particulate filler material directly into the resin- and catalyst-containing stream at a fixed angle of about 90 degrees with respect to the longitudinal axis of the spray pattern. The particles of filler material are stored in a container or tank equipped with a venturi pump and are carried to the spray gun in a flowing stream of compressed air. Although such a system may be suitable for injecting relatively heavy granules or particles of filler material such as clay, sand, talc, mica and the like, into the resin- and catalyst-containing stream, it is totally unsuitable for injecting relatively lightweight, hollow microspheres and other hollow bodies having a specific gravity of less than about 1.00. These lightweight filler materials tend to be cast outwardly away from the high velocity stream rather than intermixing therewith when injected at an angle generally perpendicular to the longitudinal axis of the spray pattern. Unfortunately, the atmosphere surrounding the spray gun fills with a cloud of hollow spheres, wasting the spheres and creating an unsafe, contaminated environment. Moreover, there is no provision in this system for the operator to control the concentration of the dry particulate filler material fed to the spray gun and eventually deposited in the composite structure.

SUMMARY OF THE INVENTION

The invention is directed to an improved method and apparatus for producing composite structures by spray depositing a multiple component mixture containing a liquid resin and catalyst, a dry particulate filler material such as lightweight hollow glass microspheres having a specific gravity of less than about 1.00 and, optionally, a chopped reinforcing fibrous material such as fiberglass, carbon fibers or the like. The apparatus includes nozzle means for forming a liquid resin- and catalyst-containing spray pattern directed along a longitudinal axis extending downstream from the nozzle. The nozzle means may include a single or a plurality of nozzles which are preferably mounted onto a spray gun having a gun housing.

The dry particulate filler material may be stored in a tank including a plenum chamber and a fluidizing bed chamber which are separated by a gas permeable member. The gas permeable member, which may be a porous plate, for example, uniformly disperses a gaseous medium under pressure, such as pressurized atmospheric air, into the fluidizing bed chamber for producing a fluidized suspension containing the dry particulate filler material and the gaseous medium.

A delivery tube is provided for injecting the fluidized suspension containing the dry particulate filler material into the spray pattern produced by the nozzle means for uniformly mixing the filler material together with the resin and catalyst and/or catalyzed resin, as the case may be, during the spraying operation. The delivery tube is preferably attached to a holder device which is rotatably mounted onto the spray gun housing or otherwise arranged so as to controllably position the delivery tube to inject the fluidized suspension into the spray pattern at a predetermined acute angle with respect to the longitudinal axis of the pattern.

Means are provided for delivering the fluidized suspension containing the dry particulate filler material from the storage tank to the delivery tube including preferably a venturi pump having an main gas inlet and an outlet, a venturi orifice between the main gas inlet and outlet, and an intake or suction inlet positioned close to the venturi orifice on the side facing the outlet, the intake or suction inlet communicating directly with the fluidizing bed chamber in the storage tank. A second gas inlet is provided close to the venturi orifice on the side facing the first or main gas inlet of the pump.

Figure 1:
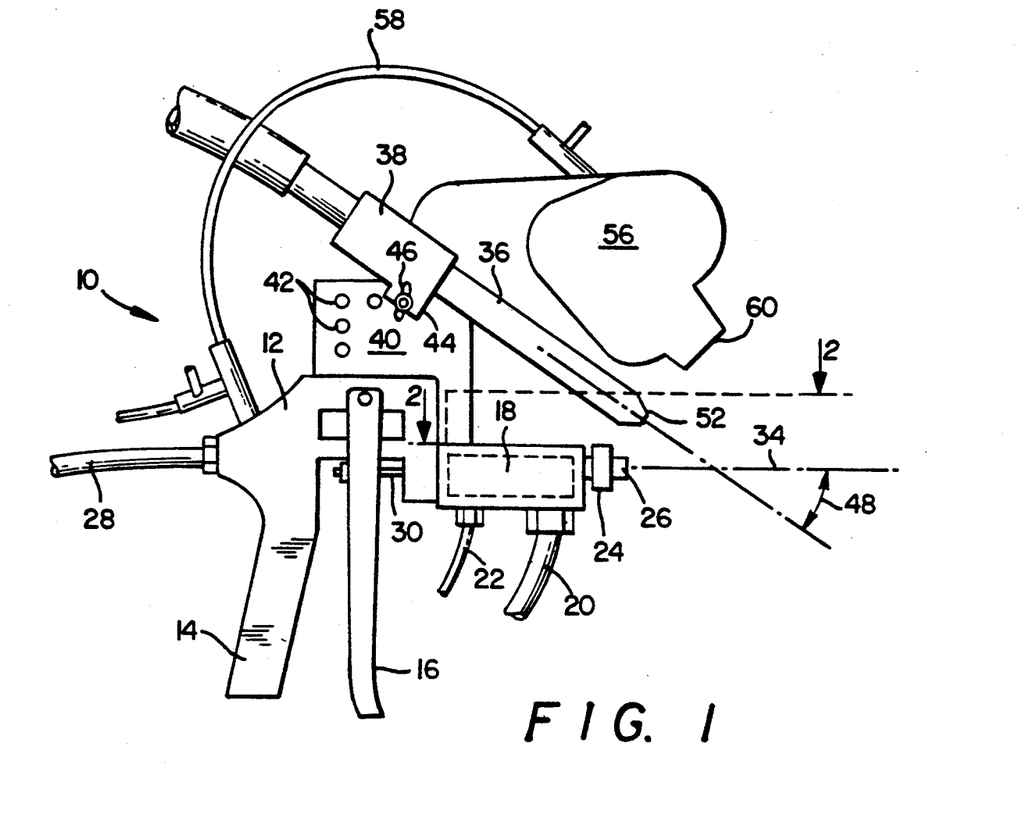
Figure 2:
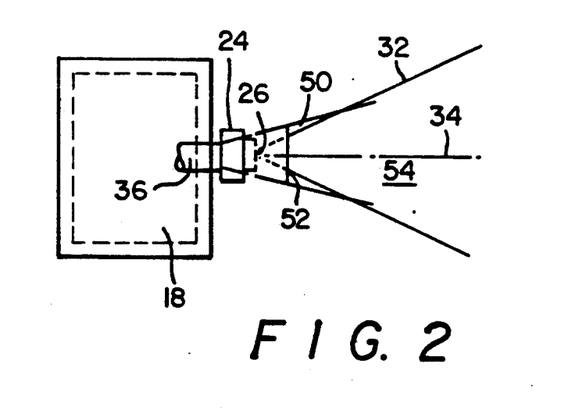
Figure 3:
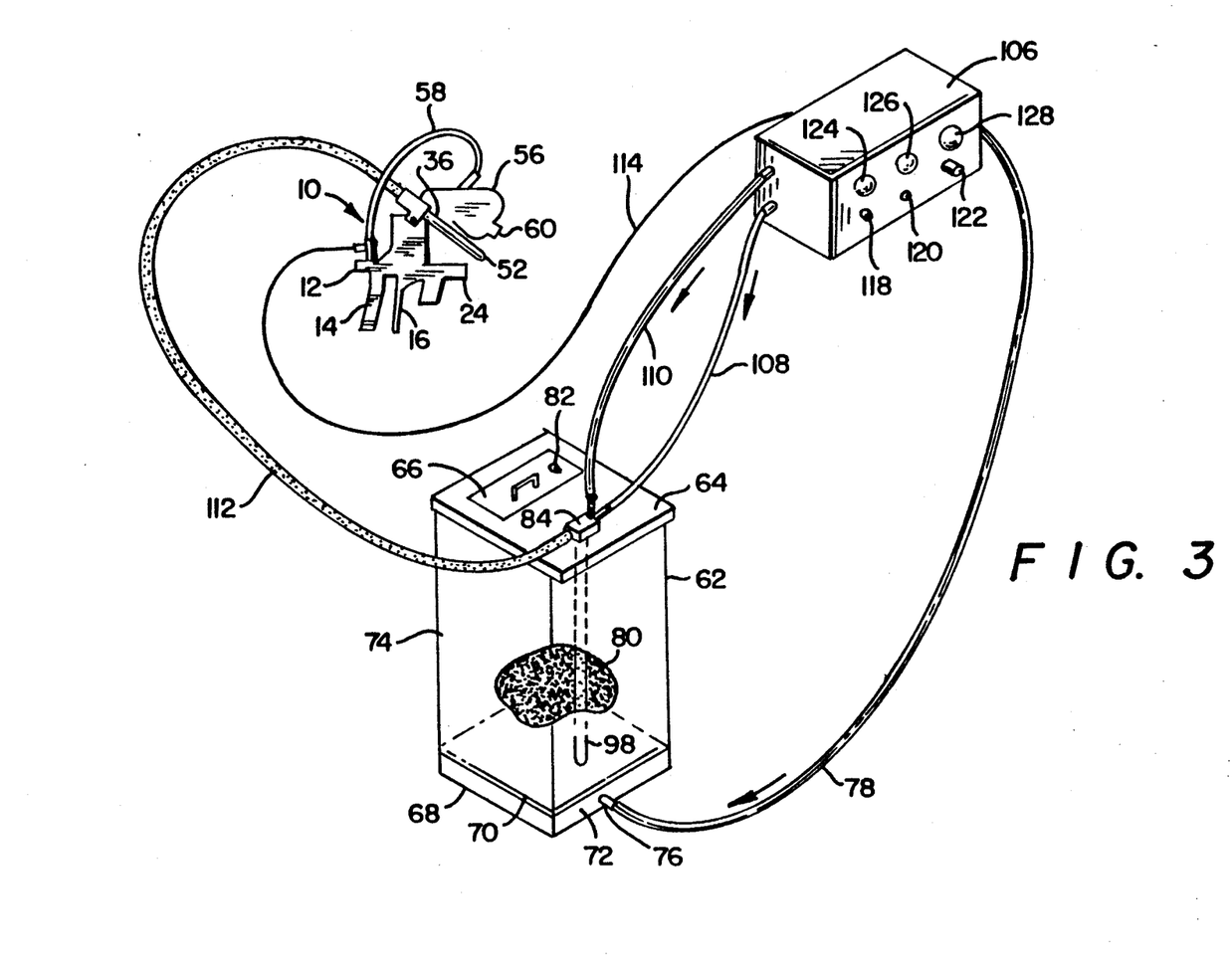

With this arrangement of the venturi pump inlets, it is possible by regulating the pressure of the gaseous medium supplied to the second gas inlet to control the amount of dry particulate filler material being drawn under vacuum from the fluidizing bed chamber and consequently the concentration of the filler material injected into the resin- and catalyst-containing spray pattern. This feature combined with the ability of the delivery tube to be controllably positioned to any acute angle with respect to the longitudinal axis of the spray pattern affords the user or operator optimum control of material density and discharge output from the spray gun. It also makes possible the use of lightweight dry particulate filler materials having very low specific gravities of less than 1.00, such as hollow glass microspheres, to produce satisfactory multiple component, composite structures without, at the same time, wasting significant amounts of the filler or extender and contaminating the surrounding environment.

The term "liquid resin- and catalyst- containing spray pattern" as used herein and in the appended claims is intended to include both liquid resin and catalyst as separate components in the spray pattern or a catalyzed or partially catalyzed resin as may be present, for example, when the liquid resin and catalyst have been premixed before reaching the spray nozzle.

BRIEF DESCRIPTION OF THE DRAWING

The invention will now be described in greater detail with particular reference to the accompanying drawing wherein like reference numerals indicate the same or similar parts and wherein:

FIG. 1 is a side elevational view of a spray gun that may be used with an apparatus according to the invention;

FIG. 2 is a top plan view of the spray nozzle and delivery tube taken along the lines 2—2 of FIG. 1;

FIG. 3 is a perspective view of an entire apparatus according to the invention including a spray gun with nozzle and delivery tube, storage tank, venturi pump and a control unit for controlling the pressures and the flow of a gaseous medium supplied to the storage tank and venturi pump;

FIG. 4 is an enlarged cross sectional view of the venturi pump used in the apparatus shown in FIG. 3;

FIG. 5 is a flow diagram showing various components of the control unit and the storage tank;

FIG. 6 is a view similar to FIG. 2 but showing another embodiment of the invention employing two nozzles for spraying the resin and catalyst;

FIG. 7 is a view similar to FIG. 1 but showing still another embodiment employing means for monitoring the volume of particulate material flowing through the venturi pump;

FIG. 8 is a view similar to FIG. 4 but showing a modified venturi pump for use in the embodiment of FIG. 7;

FIG. 9 is a cross sectional view of the modified pump taken along the lines 9—9 in FIG. 8; and FIG. 10 is a diagram of an sensor circuit for use in the embodiment shown in FIGS. 7-9, inclusive.

DESCRIPTION OF A PREFERRED EMBODIMENT

Referring now to the drawing and particularly to FIGS. 1 and 2, there is shown an apparatus for producing composite structures according to the invention which comprises a spray gun 10 having a gun housing

12 including a handle 14 and a trigger 16 for operating the spray gun. The gun housing 12 also includes a mixing chamber 18 having an inlet 20 for a liquid resin and an inlet 22 for a liquid catalyst. A single spray nozzle 24 having an orifice 26 is attached to the front end of the gun housing 12 and communicates with the mixing chamber 18. A supply hose 28 is attached to the rearward end of the gun housing 12 for supplying pressurized air to the spray gun 10.

To operate the spray gun 10, the user grasps the handle 14 and pulls the trigger 16 which opens a valve (not shown) inside the gun housing 12 via a connecting rod 30. The open valve permits pressurized air from the supply hose 28 to enter the mixing chamber 18. A mixture of resin and catalyst or precatalyzed resin, as the case may be, is then forced outwardly through the nozzle orifice 26 in a conical spray pattern 32 (see FIG. 2). The spray pattern 32 is directed downstream along a central longitudinal axis 34 extending from the nozzle orifice 26 as shown in both FIGS. 1 and 2.

A delivery tube 36 is provided for injecting a dry particulate filler material into the resin- and catalyst-containing spray pattern 32. The delivery tube 36 is attached to a tube holder 38 which is adjustably mounted onto the gun housing 12 via a bracket 40. The bracket 40 has a series of spaced apart mounting holes 42 which extend laterally across the top of the bracket 40 and also downwardly along the rearward edge of the bracket. The tube holder 38 has an apertured flange 44 depending downwardly from its forward end for rotatably securing the tube holder 38 to a selected mounting hole 42 using a bolt and wing nut 46, for example. It will be seen by this arrangement that the delivery tube 36 can be located in a number of different positions with respect to the spray nozzle 24 by selectively mounting the tube holder 38 in one of the bracket holes 42 and further that by loosening the wing nut 46, the delivery tube 36 can be easily rotated to position the tube at any predetermined acute angle 48 with respect to the central longitudinal axis 34 of the spray pattern 32.

FIG. 2 shows the stream of dry particulate filler material being discharged from the delivery tube 36 in an outwardly tapered spray pattern as shown at 50. Although many configurations are of course possible, the delivery tube 36 in this embodiment employs a wide but narrow discharge orifice 52. The intermixing action that is achieved between the liquid resin and catalyst and the dry particulate filler material as they are discharged from the nozzle and delivery tube orifices 26 and 52, respectively, is also shown in FIG. 2. It will be seen that essentially all of the components intermix within an area generally indicated by the reference numeral 54 which is only a few inches downstream from the nozzle 24.

The spray gun 12 may be further equipped with a motorized chopper 56 for cutting a fibrous reinforcing material, such as fiberglass, for example, into small discreet pieces which are then injected into the spray pattern 32 along with the dry particulate filler material. A hose 58 supplies pressurized air from the spray gun housing 12 to the chopper 56 for conveying the cut fibers in a stream through the chopper outlet 60. The chopper 56 is preferably mounted onto the delivery tube 36 so that the cut fibers will be discharged at essentially the same angle as the stream of dry particulate filler material.

The dry particulate filler material which may be lightweight hollow glass microspheres having a specific gravity of less that about 1.00, is stored in a tank 62 as shown in FIG. 3. The storage tank 62 has a sealed top cover 64 provided with a removable gas tight lid 66, and a sealed bottom end 68. A gas permeable plate 70 is disposed within the tank 62 just above the bottom end 68 and divides the tank interior into two separate chambers, a lower plenum chamber 72 and an upper fluidizing bed chamber 74. A gas inlet 76 is provided within the lower end of the tank 62 and communicates with the plenum chamber 72.

Pressurized air from a local source, such as shop air or an air compressor, is supplied to the gas inlet 76 via a supply hose 78. The air is dispersed uniformly through the gas permeable plate 70 into the upper chamber 74 where the air fluidizes or atomizes the dry particulate filler material as depicted at 80 in the cutaway portion of the tank 62 shown in FIG. 3. The dry particulate filler material 80 remains in suspension inside the tank 62 so long as pressurized air is applied to the gas inlet 76 during operation of the apparatus. A gas relief valve 82 is mounted within the lid 66 and prevents the buildup of excessive gas pressure inside the tank.

Figure 4:
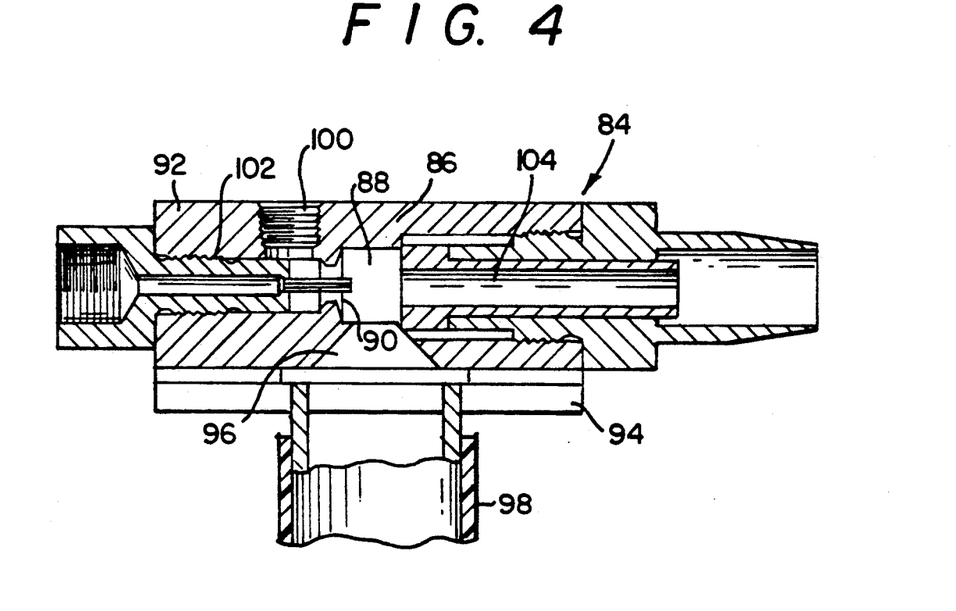

A venturi pump 84 is mounted on top of the tank cover 64 for removing controlled quantities of the dry particulate filler material from the tank 62. The filler material is carried to the spray gun 10 along with a stream of pressurized air as shall be described hereinafter in greater detail. The construction of the venturi pump 84 is shown in FIG. 4.

The venturi pump 84 includes an elongated body 86 having a longitudinal bore extending from one end to the other forming a venturi chamber 88. A venturi orifice 90 is located inside the chamber 88 between the inlet end 92 and the outlet end 94 of the pump. A suction intake 96 is provided in the side wall of the body 86 adjacent to the venturi orifice 90 on the side facing the outlet end 94. A suction tube 98 is attached to the intake 96 and extends downwardly from the top cover 64 into the fluidizing bed chamber 74. A gas inlet 100 is provided in the side wall of the body 86 and communicates with the venturi chamber 88. The gas inlet 100 is located adjacent to the venturi orifice 90 on the side facing the inlet end 92. A venturi nozzle 102 is mounted inside the inlet end 92 and forms the main gas inlet to the pump. The nozzle 102 extends through the chamber 88 up to the venturi orifice 90. A restrictor tube 104 is positioned inside the chamber 88 and extends from the venturi orifice 90 up to and through the outlet end 94.

Pressurized air is fed to the venturi nozzle 102 from a pneumatic control unit 106 via a supply hose 108 under a controlled pressure of about 30 p.s.i. At the same time, pressurized air is supplied to the second gas inlet 100 of the pump from the control unit 106 via a supply hose 110 at a controlled pressure of about 15 p.s.i. With this arrangement of the two gas inlets, it is possible to control or vary the suction applied to the intake 96 and thus the quantity of dry particulate filler material withdrawn from the storage tank 62 at any given time. Any increase in the air supply at the second gas inlet 100 will cause a turbulence to be created in the area just downstream from the venturi orifice 90 which turbulence will decrease the suction at the intake 96 and reduce the flow of dry particulate filler material from the storage tank 62. The converse is also true in that any decrease in air pressure at the second inlet 100 will increase the quantity of dry particulate material withdrawn from the tank.

The dry particulate filler material is conveyed from the venturi pump 84 to the spray gun 10 by means of an elongated anti-static feed hose 112. Although not shown in the drawing, this hose is electrically grounded so that any electrical charges that may be created due to the flow of the particulate material through the hose will dissipated safely to ground potential and avoid any harmful damage to either the operator or equipment.

A small feedback tube 114 is connected between the spray gun 10 and the control unit 106. This feed tube provides a pressure signal at the control unit 106 for activating or shutting down the apparatus as shall be described in greater detail hereinafter.

Figure 5:
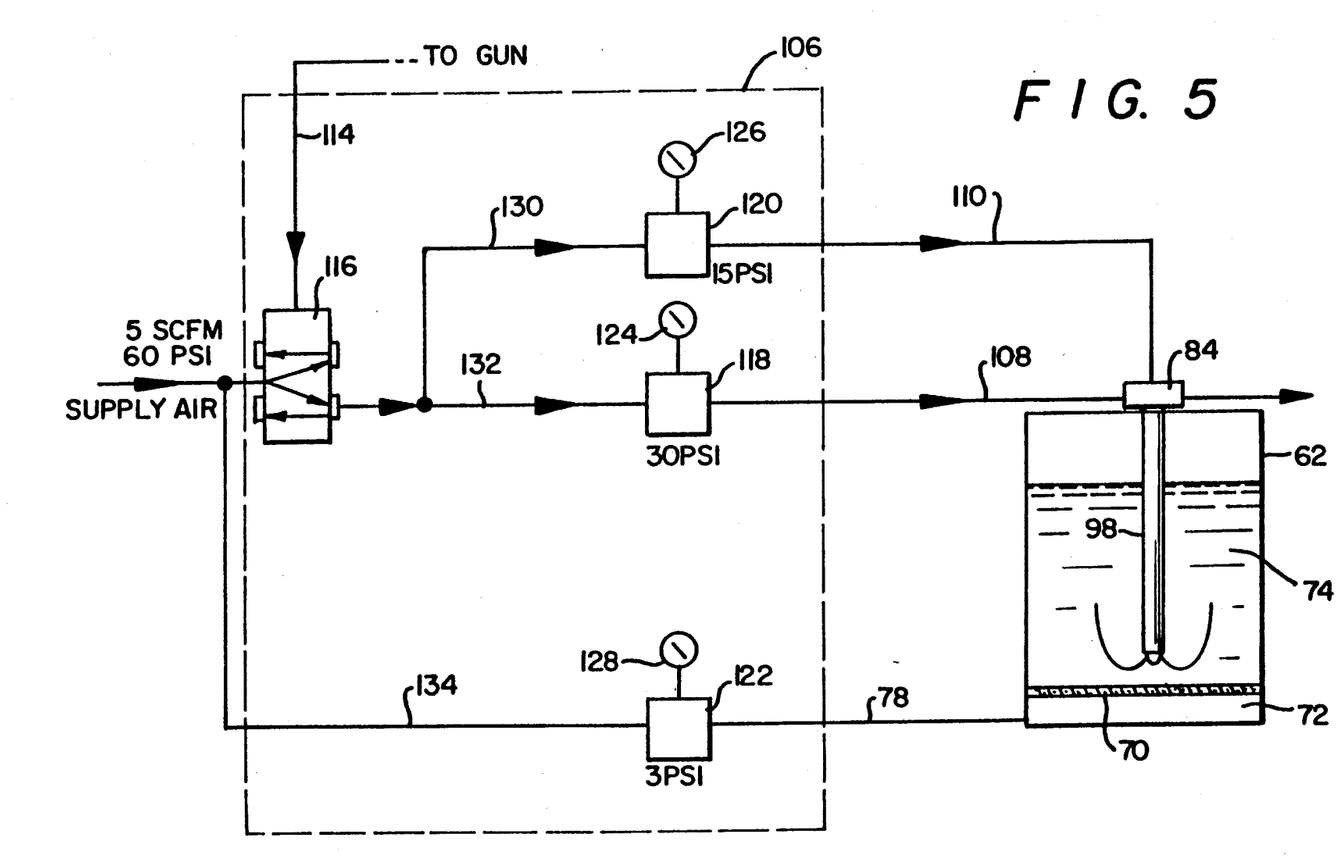

FIG. 5 shows the component parts of the pneumatic control unit 106. As shown, the control unit includes a logic valve 116, two pressure regulating and flow control valves 118 and 120, and a single flow control valve 122. Each of the control valves 118, 120 and 122 has its own sight gauge 124, 126 and 128, respectively, for visually recording the pressure and/or volume of air flowing through the valve. Both of the control valves 118, 120 are connected to the outlet of the logic valve 116 via two internal lines 130, 132, respectively, while the control valve 122 is connected between the inlet of the logic valve 116 and the main air supply via an internal line 134. The logic valve 116 toggles between an "on" and "off" condition in response to pressure signals fed through the feedback tube 114 from the spray gun 10.

Pressurized air from the main supply enters the sealed plenum chamber 72 of the storage tank 62 through the supply hose 78 connected to the flow control valve 122. The air passes through the porous plate 70 into the chamber 74 and fluidizes or atomizes the dry particulate filler material. The flow control valve 122 meters the volume of air that passes through the porous plate 70, while the relief valve 82 prevents the buildup of excessive gas pressure inside the storage tank 62.

When the trigger 16 is depressed, the logic valve 116 allows pressurized air to pass to both venturi inlets 92, 100 and thence onto the spray gun 10. The pressurized air flows through both of the control valves 118, 120 and the respective supply hoses 108, 110. When the trigger 16 is released, pressure is removed in the feedback tube 114 which causes the control unit 116 to shut off the pressurized air from the main supply along with the flow of dry particulate filler material to the spray gun 10.

The supply of pressurized air to the main gas inlet or nozzle 102 of the pump 84 is adjustable by means of the control valve 118 and can be easily monitored by the sight gauge 124. The air flows through the supply hose 108 directly to the venturi nozzle 102. This venturi air creates a vacuum inside the pump chamber 88 which communicates with the suction tube 98. The venturi nozzle 102 creates at its tip a high velocity output of pressurized air which assists in forcing the dry particulate filler material through the restrictor tube 104 and then out through the pump outlet end 94. The filler material is then delivered through the anti-static feed hose 112 to the spray gun 10.

The supply of pressurized air to the second gas inlet 100 is adjustable by means of the control valve 120 and can be visually monitored by the sight gauge 126. The pressurized air mixes with the venturi supply air entering the main gas inlet 102 and controls the amount of filler material delivered to the venturi orifice 90 via the suction tube 98.

Figure 6:
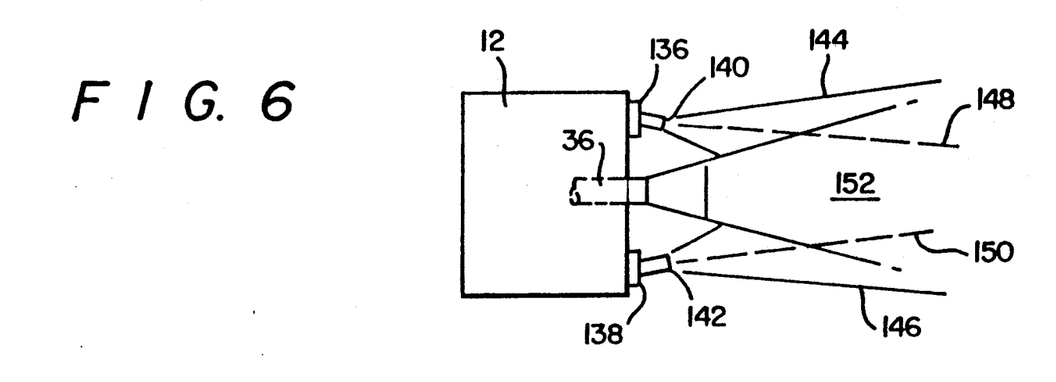
Figure 7:
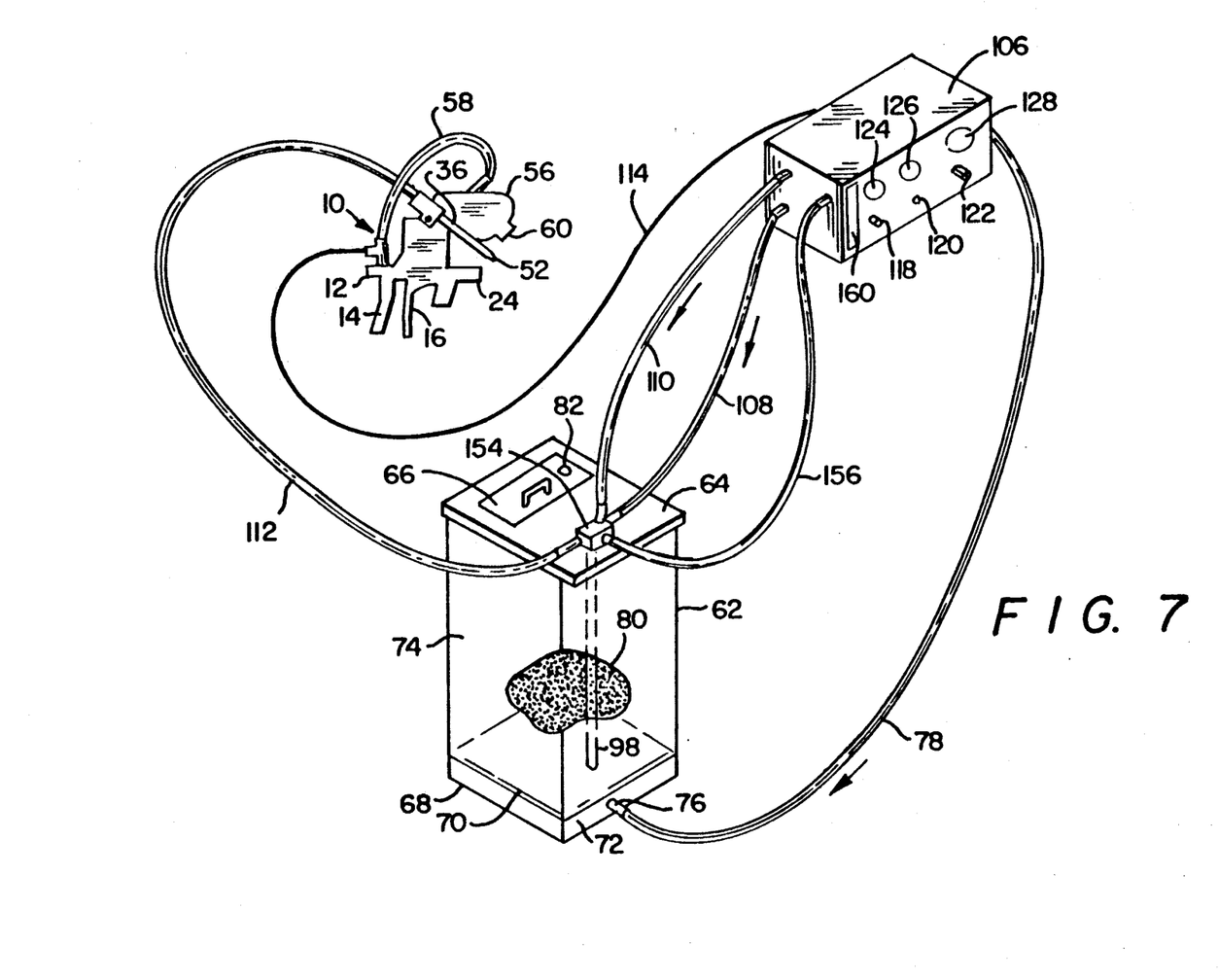

Another embodiment of the invention is shown in FIG. 6 wherein the spray gun 10 incorporates two separate spray nozzles 136, 138. The spray nozzles have discharge orifices 140, 142 which produce two separate conical spray patterns 144, 146 along two central longitudinal axes 148, 150. The nozzles are arranged in such a way that the two spray patterns 144, 146 intersect one another at a point downstream from their respective orifices 140, 142 in an area shown at 152. This results in a thorough intermixing of the two spray patterns, one containing a liquid resin and the other containing a liquid catalyst. With this arrangement, there is no necessity to incorporate a mixing chamber inside the spray gun as described hereinabove. The dry particulate filler material is injected into the intersecting spray patterns in basically the same manner as described hereinabove. In this case, however, the filler material may be injected at an acute angle with respect to the resultant longitudinal axis lying between the two axes 148, 150 of the intersecting spray patterns.

Figure 8:
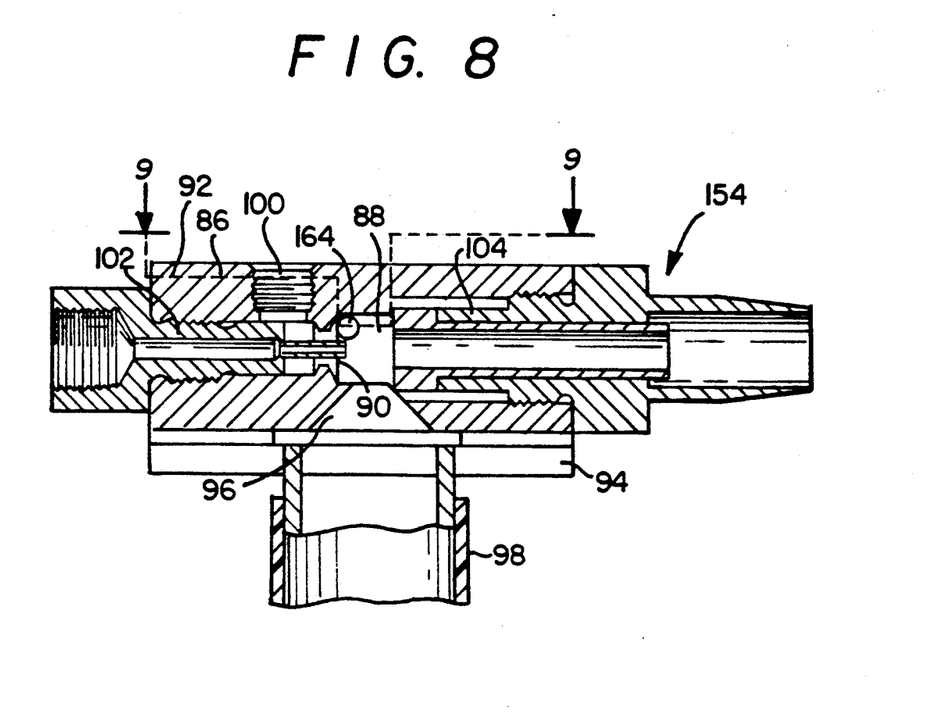
Figure 9:
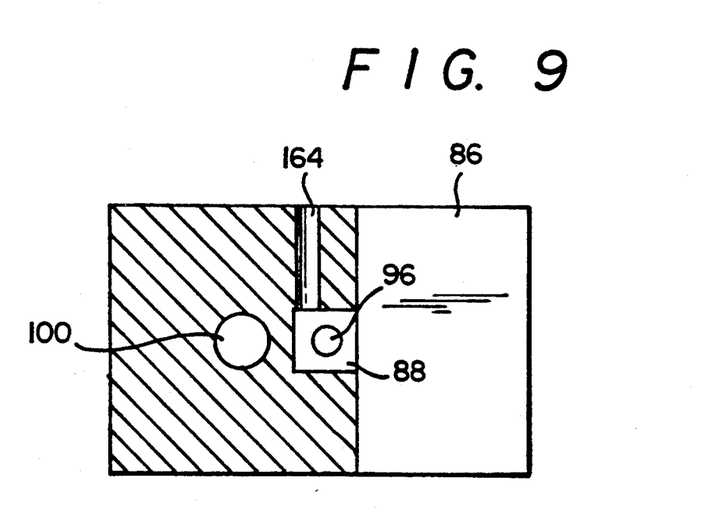
Figure 10:
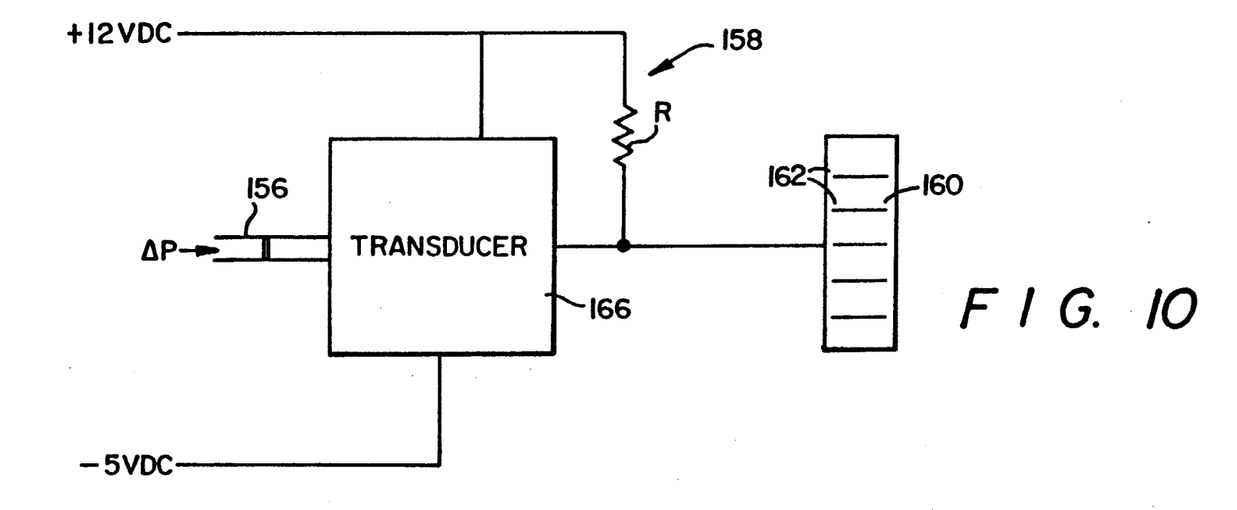

FIGS. 7-10, inclusive, show a further embodiment of the invention wherein means are provided for monitoring the volume flow rate of the fluidized suspension passing through the venturi pump. The apparatus is basically the same as that described hereinabove except for a modification in the venturi pump 154 which enables changes in vacuum at the orifice 90 to be transmitted back to the control unit 106 via a hose connection 156. A circuit 158 inside the control unit 106 senses these changes and produces a corresponding voltage signal which drives a visual display 160 as illustrated in FIG. 10. The display 160 may be, for example, a bar graph composed of a series of illuminated segments 162.

The modified venturi pump 154 is shown in detail in FIGS. 8 and 9. The construction of the pump is the same except that a hole or bore 164 is drilled through the side wall of the pump body 86 and communicates with the venturi chamber 88 just ahead of the orifice 90 and above the vacuum intake 96. Any changes in the vacuum within the chamber 88 caused by an increase or decrease in the pressure at the second gas inlet 100 are fed back to the control unit 106 via the hose 156 which is connected to the bore 164. Since changes in vacuum at the orifice 90 correspond directly to changes in the volume of dry particulate filler material withdrawn from the tank 62, these changes also represents changes in the volume of material passing through the venturi pump and eventually entering the liquid resin- and catalyst- containing stream.

When the vacuum at the venturi orifice 90 changes such as by adjustment of the control valve 120 to increase or decrease the flow volume, the change in vacuum is transmitted via the hose 156 to a pressure transducer 166 located in the control unit 106. The pressure transducer 166 converts the signal produced by the change into an electrical pulse which drives the circuit 158. The circuit then converts the signal into a usable voltage source to power the bar graph or visual display 160. The bar graph is calibrated to react by illuminating the segments 162 up or down depending on the changes in vacuum at the orifice 90. Although not shown in the drawing, the bar graph segments can be identified with numerical values showing the actual outputs from the venturi pump 154 depending upon the settings at the control unit 106. The circuit can also be calibrated to sense specific gravities under 1.00.

It will be seen from the foregoing that the apparatus of the invention represents a significant improvement over prior art devices in that it provides a unique combination of features which enables the operator to not only control the injection angle at which the dry particulate filler material is introduced into the liquid resin- and catalyst- containing spray pattern but also to control the concentration of the filler material. The ability of the operator to control the angle of injection for any given concentration of filler material greatly reduces the chances of dusting outside the spray pattern with the attendant contamination of the surrounding environment and, furthermore, insures completeness of the mixing action between the filler and the liquid resin and catalyst prior to deposition. The specific injection angle used in the practice of the invention will depend upon a number of factors, such as the weight and concentration of the filler material, but generally speaking, the angle of injection will vary between about 10 and 45 degrees. The size of the spray pattern can also be varied to achieve certain conditions, such as the thickness of the deposited coating, by varying the angle at which the spray pattern is emitted from the nozzle orifices, this angle being preferably between about 10 and 50 degrees, for example.

Although the invention has been described herein with particular reference to the use of hollow glass microspheres having a specific gravity of less than about 1.00, it will be understood that the apparatus of the invention can be employed to produce multiple component composite structures utilizing a great variety of extender materials and particularly lightweight hollow shapes such as spheres, balls, balloons, etc., of soda lime, boro silicate, sodium silicate and various thermoplastic materials, for example. The apparatus of the invention makes it possible to manufacture a variety of fiber reinforced composite structures such as fiberglass reinforced resin composites at a much lower material cost by the addition of very low density hollow glass spheres or other hollow shapes. At the same time the overall weight of the composite will be lower and the impact strength will be increased over conventional resin/glass laminates. Low cost laminates can be prepared according to conventional practices known in the art by adding low cost fillers into the resin via a premix blending operation. However, these fillers (calcium carbonate, aluminum trihydrate, etc.) all have specific gravities of greater than about 2.00. As a result, the laminate is less expensive but much heavier.

Besides lowering the cost and weight of a composite or laminate, the apparatus of the invention can be employed to produce a syntactic foam, that is, a uniform mixture of resin and hollow spheres which can be used as a lightweight filler for large voids or cavities within an existing composite structure or as a core material between two load bearing surfaces. The apparatus can be easily converted to produce such syntactic foams by simply making the necessary pressure adjustments on the control unit and turning off the glass chopper which is not required.

What is claimed is:
1. An apparatus for producing composite structures comprising, in combination:
    means for forming a liquid resin- and catalyst-containing spray pattern along a longitudinal axis;
    means for producing a fluidized suspension of dry particulate filler material in a gaseous medium;
    means for injecting said fluidized suspension into said spray pattern;
    means for delivering said fluidized suspension to said injecting means including a venturi orifice for pro- ducing a vacuum acting on said fluidized suspension;

means associated with said delivery means for controlling the concentration of said dry particulate filler material in said fluidized suspension by altering said vacuum; and means for controllably positioning said injecting means so as to inject said fluidized suspension into said spray pattern at a predetermined acute angle with respect to said longitudinal axis.

2. An apparatus as defined by claim 1, wherein said means for forming said spray pattern includes a single spray nozzle and wherein a mixing chamber is provided for mixing a liquid resin and catalyst prior to being sprayed through said single nozzle.

3. An apparatus as defined by claim 1, wherein said means for forming said spray pattern includes at least two separate nozzles, one for spraying a liquid resin and the other for spraying a liquid catalyst, said nozzles being positioned so as to spray the two components in overlapping spray patterns for mixing the same together during the spraying operation.

4. An apparatus as defined by claim 1, wherein said means for producing said fluidized suspension comprises a storage tank, a gas permeable plate disposed inside said tank and forming a gas plenum chamber on one side of said plate and a fluidizing bed chamber on the opposite side of said plate, said fluidizing bed chamber containing a supply of aid dry particulate filler material, and gas inlet means for introducing a gaseous medium into said plenum chamber, said gas permeable plate uniformly distributing said gaseous medium throughout said fluidizing bed chamber under pressure to produce said fluidized suspension.

5. An apparatus as defined by claim 4, wherein said means for delivering said fluidized suspension comprises a venturi pump having an inlet for passage of a gaseous medium under pressure and an outlet, said venturi orifice being located between said inlet and said outlet, and a vacuum intake positioned close to said orifice on the side facing said outlet, said vacuum intake communicating with said fluidizing bed chamber in said storage tank.

6. An apparatus as defined by claim 5, wherein said means associated with said delivery means for controlling the concentration of said dry particulate filler material in said fluidized suspension by altering said vacuum comprises said venturi pump further including a second inlet for a gaseous medium under pressure, said second gas inlet being positioned close to said orifice on the side facing said first gas inlet.

7. An apparatus as defined by claim 6, further including means for controlling the flow of said gaseous medium supplied to said gas inlet means to said plenum chamber.

8. An apparatus as defined by claim 7, further including means for controlling the pressure and flow of said gaseous medium supplied to said first and second gas inlet means to said venturi pump.

9. An apparatus as defined by claim 8, wherein said means for controlling the flow of said gaseous medium to said plenum chamber and said means for controlling the pressure and the flow of said gaseous medium to said first and second gas inlet means are included in a control unit.

10. An apparatus as defined by claim 1, wherein said injecting means includes a delivery tube having an exit orifice shaped to produce a predetermined injection spray pattern.

11. An apparatus as defined by claim 10, further including a spray gun having a housing and a trigger mounted on said housing for operating said spray gun.

12. An apparatus as defined by claim 11, wherein said means for forming said liquid resin- and catalyst- containing spray pattern and said injecting means for both mounted on said gun housing.

13. An apparatus as defined by claim 12, wherein said means for controllably positioning said injecting means includes a holder for holding said delivery tube, said holder being rotatably mounted onto said gun housing for controllably adjusting the acute angle at which said tube is disposed with respect to said longitudinal axis.

14. An apparatus as defined by claim 13, further including means for sensing changes in the volume flow of said fluidized suspension supplied to said delivery tube.

15. An apparatus as defined by claim 14, wherein said sensing means includes means for transmitting pressure at said venturi orifice to a pressure transducer and means for converting the output of said transducer to a visible display.

16. An apparatus as defined by claim 1, further including means for chopping a fibrous reinforcing material into short pieces and for injecting said pieces into said liquid resin- and catalyst- containing spray pattern along with a stream of said gaseous medium.

17. An apparatus for producing composite structures comprising, in combination:

a spray gun having a housing and a trigger mounted on said housing for operating said spray gun;

nozzle means mounted on said gun housing for forming a liquid resin- and catalyst- containing spray pattern along a longitudinal axis;

a storage tank having a gas permeable plate disposed inside said tank and forming a gas plenum chamber between said plate and one end of said tank and a fluidizing bed chamber between said plate and an opposite end of said tank, said fluidizing bed chamber containing a supply of dry particulate filler material, and gas inlet means for introducing a gaseous medium into said plenum chamber, said gas permeable plate uniformly distributing said gaseous medium throughout said fluidizing bed chamber under pressure to produce a fluidized suspension of said dry particulate filler material in said gaseous medium;

a delivery tube for injecting said fluidized suspension into said spray pattern;

a venturi pump for delivering said fluidized suspension to said delivery tube, said venturi pump having an inlet for passage of a gaseous medium under pressure, an outlet, a venturi orifice between said inlet and said outlet, and a vacuum intake positioned close to said orifice on the side facing said outlet, said vacuum intake communicating with said fluidizing bed chamber in said storage tank, said venturi pump further including a second inlet for a gaseous medium under pressure, said second gas inlet being positioned close to said orifice on the side facing said first gas inlet;

a control unit including means for controlling the flow of said gaseous medium supplied to said gas inlet means to said plenum chamber and means for controlling the pressure and flow of said gaseous medium to said first and second gas inlet means to said venturi pump; and means for controllably positioning said delivery tube including a holder for holding said delivery tube, said holder being rotatably mounted onto said gun housing for controllably adjusting the acute angle at which said tube is disposed with respect to said longitudinal axis.

18. A system for transporting dry particulate material at a controlled concentration while suspended in a gaseous medium, comprising;

means for storing a dry particulate material in a fluidized suspension;

a venturi pump for withdrawing said fluidized suspension from said storage means, said venturi pump having an inlet for passage of a gaseous medium under pressure, an outlet, a venturi orifice between said inlet and said outlet, and a vacuum intake positioned close to said orifice on the side facing said outlet, said vacuum intake communicating with said storage means, said venturi pump further including a second inlet for a gaseous medium under pressure, said second gas inlet being positioned close to said orifice on the side facing said first gas inlet;

means for controlling the pressure and flow of said gaseous medium to said first and second gas inlet means so as to vary the vacuum at said venturi orifice and thereby control the amount of said dry particulate material withdrawn under vacuum from said storage means; and means for sensing changes in the vacuum at said venturi orifice and for producing output signals representing corresponding changes in the amount of said dry particulate material passing through said venturi pump.

19. A system defined by claim 18, wherein said sensing means includes means for transmitting vacuum at said venturi orifice to a pressure transducer and means for converting the output of said transducer to a visible display.

20. An apparatus for producing composite structures comprising, in combination:

means for forming a liquid resin- and catalyst-containing spray pattern along a longitudinal axis;

a storage tank having a gas permeable plate disposed inside said tank and forming a gas plenum chamber on one side of said plate and a fluidizing bed chamber on the opposite side of said plate, said fluidizing bed chamber containing a supply of dry particulate filler material, and gas inlet means for introducing a gaseous medium into said plenum chamber, said gas permeable plate uniformly distributing said gaseous medium throughout said fluidizing bed chamber under pressure to produce a fluidized suspension of said dry particulate filler material in said gaseous medium;

means for injecting said fluidized suspension into said spray pattern;

a venturi pump for delivery said fluidized suspension to said injection means, said venturi pump having an inlet for passage of a gaseous medium under pressure, an outlet, a venturi orifice between said inlet and said outlet, and a vacuum intake positioned close to said orifice on the side facing said outlet, said vacuum intake communicating with said fluidizing bed chamber in said storage tank, said venturi pump further including a second inlet for a gaseous medium under pressure, said second gas inlet being positioned close to said orifice on the side facing said first gas inlet; and means for controllably positioning said injection means so as to inject said fluidized suspension into said spray pattern at a predetermined acute angle with respect to said longitudinal axis.

21. An apparatus as defined by claim 20, further including means for controlling the flow of said gaseous medium supplied to said gas inlet means to said plenum chamber.

22. An apparatus as defined by claim 21, further including means for controlling the pressure and flow of said gaseous medium supplied to said first and second gas inlet means to said venturi pump.

23. An apparatus as defined by claim 22, wherein said means for controlling the flow of said gaseous medium to said plenum chamber and said means for controlling the pressure and the flow of said gaseous medium to said first and second gas inlet means are included in a control unit.

24. An apparatus for producing composite structures comprising, in combination:

a spray gun having a housing and a trigger mounted on said housing for operating said spray gun;

means mounted on said spray gun for forming a liquid resin- and catalyst- containing spray pattern along a longitudinal axis;

means for producing a fluidized suspension of dry particulate filler material in a gaseous medium;

a delivery tube mounted on said spray gun for injecting said fluidized suspension into said spray pattern, said delivery tube having an exit orifice shaped to produce a predetermined injection spray pattern;

means for delivering said fluidized suspension to said delivery tube;

means associated with said delivery means for controlling the concentration of said particulate filler material in said fluidized suspension;

a holder for holding said delivery tube, said holder being rotatably mounted onto said gun housing for controllably adjusting the acute angle at which said tube is disposed with respect to said longitudinal axis; and means for sensing changes in the volume flow of said fluidized suspension supplied to said delivery tube.

25. An apparatus as defined by claim 24, wherein said means for delivering said fluidized suspension includes a venturi pump having a venturi orifice and wherein said sensing means includes means for transmitting pressure at said venturi orifice to a pressure transducer and means for converting the output of said transducer to a visible display.

26. A method of producing a composite structure comprising:

forming a liquid resin- and catalyst- containing spray pattern along a longitudinal axis;

producing a fluidized suspension of dry particulate filler material in a gaseous medium;

introducing said fluidized suspension into a stream containing a gaseous medium under a vacuum produced by passing said gaseous medium through a venturi orifice;

controlling the concentration of said dry particulate filler material in said fluidized suspension by altering said vacuum;

delivering said stream containing said dry particulate filler material to a point adjacent to said spray pattern; and injecting said stream into said spray pattern at a predetermined acute angle with respect to said longitudinal axis.

27. The method as defined by claim 26, wherein said dry particulate filler material are hollow microspheres having a specific gravity of less than about 1.

28. The method as defined by claim 26, further including the step of injecting a chopped fibrous material into said spray pattern along with said dry particulate filler material.

* * * * *